United States Patent [19]
Bliss et al.

[11] Patent Number: 5,966,415
[45] Date of Patent: Oct. 12, 1999

[54] ADAPTIVE EQUALIZATION IN A SUB-SAMPLED READ CHANNEL FOR A DISK STORAGE SYSTEM

[75] Inventors: William G. Bliss, Thornton; Sian She, Broomfield; David E. Reed, Westminster, all of Colo.

[73] Assignee: Cirrus Logic, Inc., Fremont, Calif.

[21] Appl. No.: 08/876,054

[22] Filed: Jun. 13, 1997

[51] Int. Cl.⁶ .................................................... H04B 1/10
[52] U.S. Cl. ........................................... 375/350; 375/341
[58] Field of Search ................................... 375/350, 341, 375/340, 232, 240, 254, 262, 263, 266; 371/40.14, 40.15, 40.16

[56] References Cited

U.S. PATENT DOCUMENTS

| | | | |
|---|---|---|---|
| 4,866,647 | 9/1989 | Farrow | 364/724.1 |
| 5,060,088 | 10/1991 | Dolivo et al. | 360/46 |
| 5,150,379 | 9/1992 | Baugh et al. | 375/14 |
| 5,235,534 | 8/1993 | Potter | 364/724.01 |
| 5,293,369 | 3/1994 | Melas et al. | 369/59 |
| 5,309,484 | 5/1994 | McLane et al. | 375/106 |
| 5,327,298 | 7/1994 | Ottesen et al. | 360/48 |
| 5,384,552 | 1/1995 | Iwasaki | 331/25 |
| 5,400,364 | 3/1995 | Yada | 375/81 |
| 5,440,532 | 8/1995 | Yokogawa et al. | 369/32 |
| 5,450,253 | 9/1995 | Seki et al. | 360/65 |
| 5,467,370 | 11/1995 | Yamasaki et al. | 375/232 |
| 5,481,568 | 1/1996 | Yada | 375/340 |
| 5,487,085 | 1/1996 | Wong-Lam et al. | 375/230 |
| 5,521,767 | 5/1996 | Weng et al. | 340/46 |
| 5,760,984 | 6/1998 | Spurbeck et al. | 360/51 |
| 5,802,118 | 9/1998 | Bliss et al. | 375/350 |
| 5,844,920 | 12/1998 | Zook et al. | 371/40.14 |

OTHER PUBLICATIONS

William L. Abbott, John M. Cioffi, and Hemant K. Thapar, "Channel Equalization Methods for Magnetic Storage," *1989 ICC '89*, Boston, MA, Jun. 1989.

William L. Abbott et al., "A Digital Chip with Adaptive Equalizer for PRML Detection in Hard–Disk Drives," *IEEE International Solid–State Circuits Conference*, Feb. 18, 1994.

John M. Cioffi et al., "Adaptive Equalization In Magnetic–Disk Storage Channels," *IEEE Communications Magazine*, Feb. 1990, pp. 14–29.

Ronald E. Chrochiere and Lawrence R. Rabiner, *Multirate Digital Signal Processing*, 1983, Prentice–Hall, pp. 127–192.

Floyd M. Gardner, "Interpolation in Digital Modems—Part I: Fundamentals," *IEEE Transactions on Communications*, vol. 41, No. 3, Mar. 1993.

(List continued on next page.)

*Primary Examiner*—Stephen Chin
*Assistant Examiner*—Mohammad Ghayour
*Attorney, Agent, or Firm*—Howard H. Sheerin; Dan A. Shifrin

[57] ABSTRACT

A sampled amplitude read channel for disk storage systems is disclosed which asynchronously sub-samples an analog read signal significantly below the Nyquist rate (the baud rate) in order to increase the effective data rate without increasing the frequency of the sampling device. Interpolated timing recovery up-samples the asynchronous samples to generate sample values synchronized to the baud rate, and a Viterbi sequence detector detects the recorded digital data from the synchronous sample values. To compensate for the time-varying characteristics of the recording device, a discrete-time equalizer adaptively equalizes the asynchronous sample values using a least mean square (LMS) adaptive algorithm, $$\underline{W}_{k+1} = \underline{W}_k - \mu \cdot e_k \underline{X}_k,$$

where $\underline{W}_k$ is a vector of FIR filter coefficients, $\mu$ is a programmable gain, $e_k$ is a sample error between the FIR filter's actual output and a desired output, and $\underline{X}_k$ is a vector of samples values from the FIR filter input.

20 Claims, 9 Drawing Sheets

FIG. 3

OTHER PUBLICATIONS

Floyd M. Gardner, "Interpolation in Digital Modems—Part II: Implementation and Performance," *IEEE Transactions on Communications,* vol. 41, No. 6, Jun. 1993.

C. M. Melas, P. Sutardja, "An Asynchronous Fully Digital Channel for Magnetic Recording," *IEEE Globecoml '94,* vol. 2 of 3, pp. 1144–1147, 1994.

Razmik Karabed and Paul Siegel, "Coding For High Order Partial Response Channels," *SPIE–Proceedings,* Oct. 23–24, 1995, Philadelphia, PA, vol. 2605.

William Bliss and David E. Reed, "Analysis of HDD Thin–Film–Head Read Channel Performance as a Function of Media Thickness and RLL Code d Constraint," *IEEE Inter Mag '96,* Seattle, WA, Apr. 1996.

J. Moon and B. Brickner, "Maximum Transition Run Codes for Data Storage Systems," *IEEE Inter Mag.,* Seattle, WA, Apr. 1996.

Jan W. M. Bergmans, "A Partial Receiver For Miller–Squared Encoded Signals with Half the Usual Operating Speed," *IEEE Transactions on Magnetics,* vol. 26, No. 5, Sep. 1990.

Jan W. M. Bergmans, "Partial Response Decoding of Rate ½ Modulation Codes for Digital Storage," *IEEE Transactions on Communications,* vol. 39, No. 11, pp. 1569–1581, Nov. 1991.

ADAPTIVE EQUALIZATION IN A SUB-SAMPLED READ CHANNEL FOR A DISK STORAGE SYSTEM

CROSS REFERENCE TO RELATED APPLICATIONS AND PATENTS

This application is related to other co-pending U.S. patent applications, namely application Ser. No. 08/751,880 entitled "Zero Phase Restart for Interpolated Timing Recovery in a Sampled Amplitude Read Channel," application Ser. No. 08/640,410 entitled "Gain and Phase Constrained Adaptive Equalizing Filter in a Sampled Amplitude Read Channel for Magnetic Recording," application Ser. No. 08/341,251 entitled "Sampled Amplitude Read Channel Comprising Sample Estimation Equalization, Defect Scanning, Channel Quality, Digital Servo Demodulation, PID Filter for Timing Recovery, and DC Offset Control," and application Ser. No. 08/701,572 entitled "Improved Timing Recovery For Synchronous Partial Response Recording." This application is also related to several U.S. patents, namely U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," U.S. Pat. No. 5,329,554 entitled "Digital Pulse Detector," and U.S. Pat. No. 5,424,881 entitled "Synchronous Read Channel." All of the above-named patent applications and patents are assigned to the same entity, and all are incorporated herein by reference.

FIELD OF INVENTION

The present invention relates to the control of disk storage systems for digital computers, particularly to a sampled amplitude read channel that employs asynchronous sub-sampling of an analog read signal significantly below the Nyquist rate, interpolated timing recovery, and adaptive discrete-time equalization.

BACKGROUND OF THE INVENTION

Computer storage systems (such as optical, magnetic, and the like) record digital data onto the surface of a storage medium, which is typically in the form of a rotating magnetic or optical disk, by altering a surface characteristic of the disk. The digital data serves to modulate the operation of a write transducer (write head) which records binary sequences onto the disk in radially concentric or spiral tracks. In magnetic recording systems, for example, the digital data modulates the current in a write coil in order to record a series of magnetic flux transitions onto the surface of a magnetizable disk. And in optical recording systems, for example, the digital data may modulate the intensity of a laser beam in order to record a series of "pits" onto the surface of an optical disk. When reading this recorded data, a read transducer (read head), positioned in close proximity to the rotating disk, detects the alterations on the medium and generates a sequence of corresponding pulses in an analog read signal. These pulses are then detected and decoded by read channel circuitry in order to reproduce the digital sequence.

Detecting and decoding the pulses into a digital sequence can be performed by a simple peak detector in a conventional analog read channel or, as in more recent designs, by a discrete-time sequence detector in a sampled amplitude read channel. Discrete-time sequence detectors are preferred over simple analog pulse detectors because they compensate for intersymbol interference (ISI) and are less susceptible to channel noise. Consequently, discrete-time sequence detectors increase the capacity and reliability of the storage system. There are several well known discrete-time sequence detection methods including discrete-time pulse detection (DPD), partial response (PR) with Viterbi detection, maximum likelihood sequence detection (MLSD), decision-feedback equalization (DFE), enhanced decision-feedback equalization (EDFE), and fixed-delay tree-search with decision-feedback (FDTS/DF).

In a conventional peak detection read channel, analog circuitry detects peaks in the continuous time analog read signal generated by the read head. The analog read signal is "segmented" into bit cell periods and interpreted during these segments of time. The presence of a peak during the bit cell period is detected as a "1" bit, whereas the absence of a peak is detected as a "0" bit. The most common errors in detection occur when the bit cells are not correctly aligned with the analog pulse data. Timing recovery, then, adjusts the bit cell periods so that the peaks occur in the center of the bit cells on average in order to minimize detection errors. Since timing information is derived only when peaks are detected, the input data stream is normally run length limited (RLL) to limit the number of consecutive "0" bits.

As the pulses are packed closer together on the data tracks in the effort to increase data density, detection errors can also occur due to intersymbol interference (ISI), a distortion in the read signal caused by closely spaced, overlapping pulses. This interference can cause a peak to shift out of its bit cell, or its magnitude to decrease, resulting in a detection error. This ISI effect is reduced by decreasing the data density or by employing an encoding scheme that ensures a minimum number of "0" bits occur between "1" bits. For example, a (d,k) run length limited (RLL) code constrains to d the minimum number of "0" bits between "1" bits, and to k the maximum number of consecutive "0" bits. A typical (1,7) RLL $\frac{2}{3}$ rate code encodes 8 bit data words into 12 bit codewords to satisfy the (1,7) constraint.

Sampled amplitude detection, such as partial response (PR) with Viterbi detection, allows for increased data density by compensating for intersymbol interference and the effect of channel noise. Unlike conventional peak detection systems, sampled amplitude recording detects digital data by interpreting, at discrete time instances, the actual value of the pulse data. To this end, the read channel comprises a sampling device for sampling the analog read signal, and a timing recovery circuit for synchronizing the samples to the baud rate (code bit rate). Before sampling the pulses, a variable gain amplifier adjusts the read signal's amplitude to a nominal value, and a low pass analog filter filters the read signal to attenuate channel and aliasing noise. After sampling, a discrete equalizer equalizes the sample values according to a desired partial response, and a discrete-time sequence detector, such as a Viterbi detector, interprets the equalized sample values in context to determine a most likely sequence for the recorded digital data (i.e., maximum likelihood sequence detection (MLSD)). MLSD takes into account the effect of ISI and channel noise in the detection algorithm, thereby decreasing the probability of a detection error. This increases the effective signal to noise ratio and, for a given (d,k) constraint, allows for significantly higher data density as compared to conventional analog peak detection read channels.

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, Sept.

1975; and Edward A. Lee and David G. Messerschmitt, "Digital Communication", Kluwer Academic Publishers, Boston, 1990; and G. D. Forney, Jr., "The Viterbi Algorithm", *Proc. IEEE,* Vol. 61, pp. 268–278, March 1973.

Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications,* Vol. 10 No. 1, January 1992, pp.38–56; and Wood et al, "Viterbi Detection of Class IV Partial Response on a Magnetic Recording Channel", *IEEE Trans. Commun.,* Vol. Com-34, No. 5, pp. 454–461, May 1986; and Coker Et al, "Implementation of PRML in a Rigid Disk Drive", *IEEE Trans. on Magnetics,* Vol. 27, No. 6, Nov. 1991; and Carley et al, "Adaptive Continous-Time Equalization Followed By FDTS/DF Sequence Detection", *Digest of The Magnetic Recording Conference,* August 15–17, 1994, pp. C3; and Moon et al, "Constrained-Complexity Equalizer Design for Fixed Delay Tree Search with Decision Feedback", *IEEE Trans. on Magnetics,* Vol. 30, No. 5, Sept. 1994; and Abbott et al, "Timing Recovery For Adaptive Decision Feedback Equalization of The Magnetic Storage Channel", *Globecom '90 IEEE Global Telecommunications Conference* 1990, San Diego, Calif., Nov. 1990, pp.1794–1799; and Abbott et al, "Performance of Digital Magnetic Recording with Equalization and Offtrack Interference", *IEEE Transactions on Magnetics,* Vol. 27, No. 1, Jan. 1991; and Cioffi et al, "Adaptive Equalization in Magnetic-Disk Storage Channels", *IEEE Communication Magazine,* Feb. 1990; and Roger Wood, "Enhanced Decision Feedback Equalization", *Intermag '90.*

The principles disclosed herein are applicable regardless as to the particular discrete-time sequence detection method employed. The present invention applies to the above-identified sequence detection methods as well as others not mentioned, and even future techniques.

Similar to conventional peak detection systems, sampled amplitude detection requires timing recovery in order to correctly extract the digital sequence. Rather than process the continuous signal to align peaks to the center of bit cell periods as in peak detection systems, sampled amplitude systems synchronize the pulse samples to the baud rate. In conventional sampled amplitude read channels, timing recovery synchronizes a sampling clock by minimizing an error between the signal sample values and estimated sample values. A pulse detector or slicer determines the estimated sample values from the read signal samples. Even in the presence of ISI the sample values can be estimated and, together with the signal sample values, used to synchronize the sampling of the analog pulses in a decision-directed feedback system.

A phase-locked-loop (PLL) normally implements the timing recovery decision-directed feedback system. The PLL comprises a phase detector for generating a phase error estimate based on the difference between the estimated samples and the read signal samples. A PLL loop filter filters the phase error, and the filtered phase error operates to synchronize the channel samples to the baud rate.

Conventionally, the phase error adjusts the frequency of a sampling clock which is typically the output of a variable frequency oscillator (VFO). The output of the VFO controls a sampling device, such as an analog-to-digital (A/D) converter, to synchronize the sampling to the baud rate.

As mentioned above, sampled amplitude read channels also commonly employ a discrete-time equalizer to equalize the sample values into a desired partial response (PR4, EPR4, EEPR4, etc.) before sequence detection. To this end, adaptive algorithms have been applied to compensate in real time for parameter variations in the recording system and across the disk radius. For example, U.S. Pat. No. 5,381,359 entitled "Adaptation and Training of Digital Finite Impulse Response Filter Within PRML Sampling Data Detection Channel", discloses an adaptive equalizer filter that operates according to a well known least mean square (LMS) algorithm, $$\underline{W}_{k+1} = \underline{W}_k - \mu \cdot e_k \cdot \underline{X}_k,$$

where $\underline{W}_k$ is a vector of filter coefficients; $\mu$ is a programmable gain; $e_k$ is a sample error between the filter's actual output and a desired output; and $\underline{X}_k$ is a vector of sample values from the filter input. In other words, the LMS adaptive equalizer filter is a closed loop feedback system that attempts to minimize the mean squared error between an actual output of the filter and a desired output by continuously adjusting the filter's coefficients to achieve an optimum frequency response.

The prior art LMS adaptive algorithm described above assumes that the analog read signal is sampled at the Nyquist rate (i.e., synchronous to the baud rate), and that the entire signal spectrum is available for adapting the filter coefficients in order to minimize the mean squared error between the actual and ideal channel response. The conventional LMS adaptation algorithm is sub-optimum, however, if the signal spectrum is bandlimited in a sub-sampled read channel in order to attenuate noise due to aliasing.

There is, therefore, a need for an adaptive, discrete-time equalizer filter in a sampled amplitude read channel that can compensate for the adverse effects of bandlimiting the signal spectrum to attenuate aliasing caused by sub-sampling the analog read signal (i.e., sampling below the Nyquist rate).

SUMMARY OF THE INVENTION

A sampled amplitude read channel for disk storage systems is disclosed which asynchronously sub-samples an analog read signal significantly below the Nyquist rate (the baud rate) in order to increase the effective data rate without increasing the frequency of the sampling device. Interpolated timing recovery up-samples the asynchronous samples to generate sample values synchronized to the baud rate, and a Viterbi sequence detector detects the recorded digital data from the synchronous sample values. To compensate for the time-varying characteristics of the recording device, a discrete-time equalizer adaptively equalizes the asynchronous sample values using a least mean square (LMS) adaptive algorithm, $$\underline{W}_{k+1} = \underline{W}_k - \mu \cdot e_k \cdot \underline{X}_k,$$

where $\underline{W}_k$ is a vector of FIR filter coefficients, $\mu$ is a programmable gain, $e_k$ is a sample error between the FIR filter's actual output and a desired output, and $\underline{X}_k$ is a vector of samples values from the FIR filter input. Because the analog read signal is sampled significantly below the Nyquist rate, the present invention bandlimits the signal spectrum by reducing the cutoff frequency of an analog receive filter to attenuate the undesirable effect of aliasing. This requires a modification to the equalizer's LMS adaptive algorithm: the error signal $e_k$, which represents the difference between the actual and ideal frequency response, is low-pass filtered to remove the component corresponding to the cutoff part of the signal spectrum. The spectrum of the error filter is also matched to the bandlimited signal spectrum to compensate for the non-ideal characteristics of interpolated timing recovery.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Conventional Sampled Amplitude Read Channel

Figure 1:
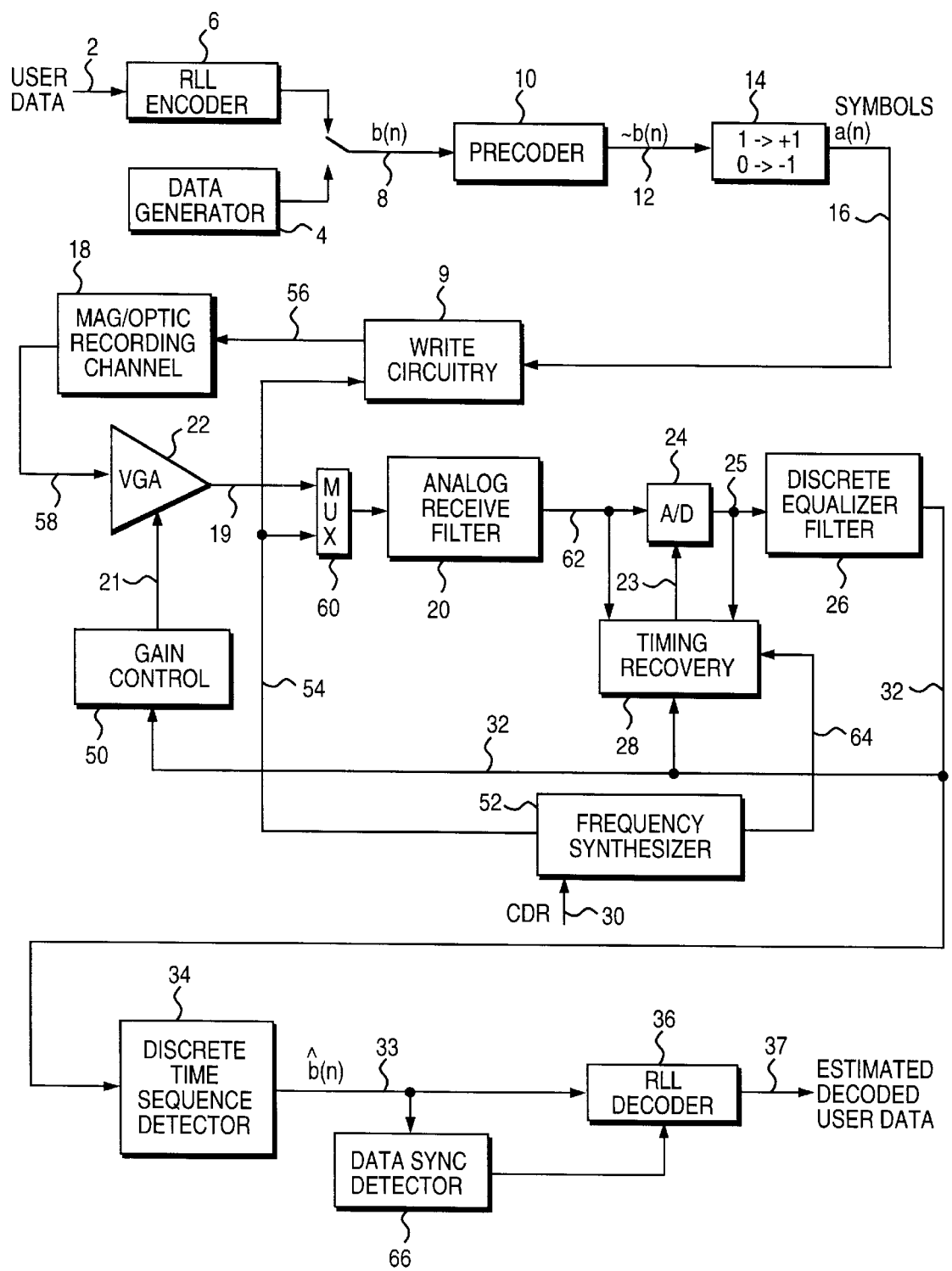
FIG. 1 is a block diagram of a conventional sampled amplitude recording channel.

Referring now to FIG. 1, shown is a detailed block diagram of a conventional sampled amplitude read channel. During a write operation, preamble data from a data generator 4 (for example 2T preamble data) and a sync mark 70 followed by user data 2 are written onto the storage medium. An RLL encoder 6 encodes the user data 2 into a binary sequence b(n) 8 according to an RLL constraint. A precoder 10 precodes the binary sequence b(n) 8 in order to compensate for the transfer function of the recording channel 18 and equalizing filters to form a precoded sequence ~b(n) 12. The precoded sequence ~b(n) 12 is converted into symbols a(n) 16 by translating 14 ~b(N)=0 into a(N)=−1, and ~b(N)=1 into a(N)=+1. Write circuitry 9, responsive to the symbols a(n) 16, modulates the current in the recording head coil (or intensity of a laser beam) at the baud rate 1/T to record the binary sequence onto the storage medium. A frequency synthesizer 52 provides a baud rate write clock 54 to the write circuitry 9 and is adjusted by a channel data rate signal (CDR) 30 according to the zone the recording head is over ("zoned" recording is described below with reference to FIG. 2A).

When reading the recorded binary sequence from the storage medium, timing recovery 28 first locks to the write frequency by selecting, as the input to the read channel, the write clock 54 through a multiplexer 60. Once locked to the write frequency, the multiplexer 60 selects the analog signal 19 from the read head as the input to the read channel in order to acquire an acquisition preamble recorded on the disk prior to the recorded user data. A variable gain amplifier 22 adjusts the amplitude of the analog read signal 58, and an analog filter 20 provides initial equalization toward the desired response as well as attenuating channel and aliasing noise. A sampling device 24 samples the analog read signal 62 from the analog receive filter 20, and a discrete-time equalizer filter 26 provides further equalization of the sample values 25 toward the desired response. In partial response recording, for example, the desired response is often selected from Table 1.

TABLE 1

| Channel | Transfer Function | Dipulse Response |
|---|---|---|
| PR4 | (1 − D) (1 + D) | 0, 1, 0, −1, 0, 0, 0, . . . |
| EPR4 | (1 − D) (1 + D)$^2$ | 0, 1, 1, −1, −1, 0, 0, . . . |
| EEPR4 | (1 − D) (1 + D)$^3$ | 0, 1, 2, 0, −2, −1, 0, . . . |

After equalization, the equalized sample values 32 are applied to a decision directed gain control 50 and timing recovery 28 circuit for adjusting the amplitude of the read signal 58 and the frequency and phase of the sampling device 24, respectively. Timing recovery adjusts the frequency of sampling device 24 over line 23 in order to synchronize the equalized samples 32 to the baud rate. Frequency synthesizer 52 provides a course center frequency setting to the timing recovery circuit 28 over line 64 in order to center the frequency of a variable frequency oscillator (VFO) over temperature, voltage, and process variations. The channel data rate (CDR) signal 30 adjusts a frequency range of the synthesizer 52 according to the data rate for the current zone. Gain control 50 adjusts the gain of variable gain amplifier 22 over line 21 in order to match the magnitude of the channel's frequency response to the desired partial response.

The equalized samples Y(n) 32 are ultimately processed by a discrete-time sequence detector 34, such as a maximum likelihood (ML) Viterbi sequence detector, which detects an estimated binary sequence ^b(n) 33 from the sample values. An RLL decoder 36 decodes the estimated binary sequence ^b(n) 33 output by the sequence detector 34 into estimated user data 37. A data sync detector 66 detects the sync mark 70 in the data sector 15 (shown in FIG. 2B described below) in order to frame operation of the RLL decoder 36. In the absence of errors, the estimated binary sequence ^b(n) 33 matches the recorded binary sequence b(n) 8, and the decoded user data 37 matches the recorded user data 2.

Data Format

Figure 2A:
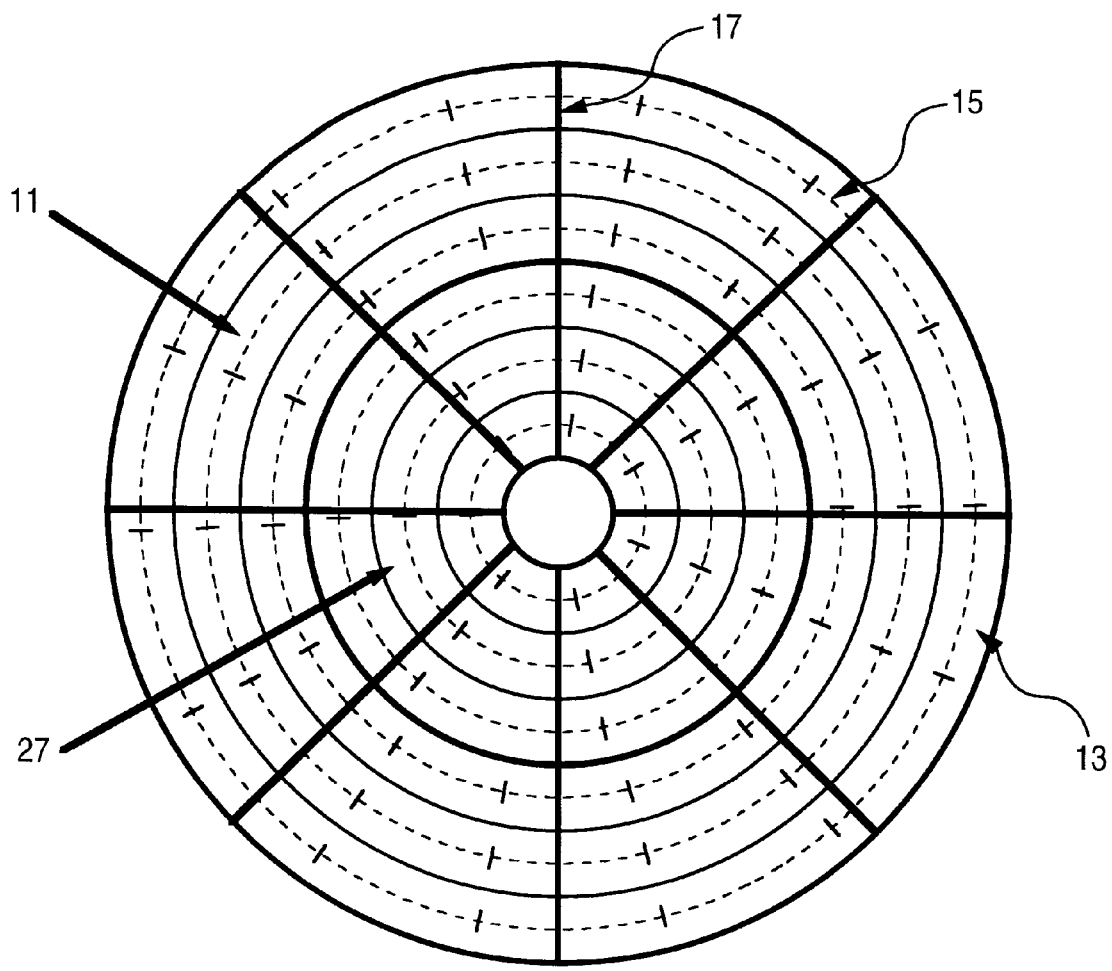
FIG. 2A shows an exemplary data format of a magnetic disk having a plurality of concentric tracks comprised of a plurality of user data sectors and embedded servo data sectors.

FIG. 2A shows an exemplary data format of a magnetic disk storage medium comprising a series of concentric data tracks 13 wherein each data track 13 comprises a plurality of sectors 15 with embedded servo wedges 17. A servo controller (not shown) processes the servo data in the servo wedges 17 and, in response thereto, positions the read/write head over a desired track. Additionally, the servo controller processes servo bursts within the servo wedges 17 to keep the head aligned over a centerline of the desired track while writing and reading data. The digital information within the servo wedges 17 may be detected by a simple discrete-time pulse detector or by the discrete-time sequence detector 34.

Figure 2B:
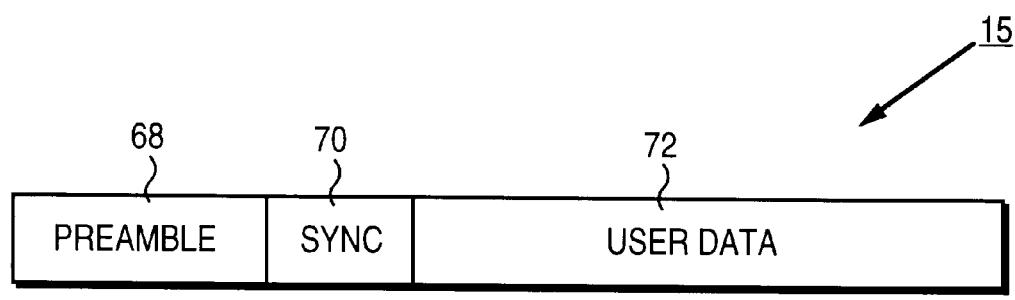
FIG. 2B shows an exemplary format of a user data sector.

FIG. 2B shows the format of a data sector 15 comprising an acquisition preamble 68, a sync mark 70, and user data 72. Timing recovery processes the acquisition preamble 68 to acquire the correct sampling frequency and phase before reading the user data 72, and the sync mark 70 signals the beginning of the user data 72 for symbol-synchronizing the RLL decoder 36.

To increase the overall storage density, the disk is partitioned into an outer zone 11 comprising fourteen data sectors per track, and an inner zone 27 comprising seven data sectors per track. In practice, the disk is actually partitioned into several zones with a different number of sectors in each zone, and the data recorded and detected at a different data rate in each zone. This technique, referred to as "zoned" recording, is made possible due to the decrease in intersymbol interference at the outer diameter tracks.

Sub-sampled Read Channel With Adaptive Equalization

Figure 3:
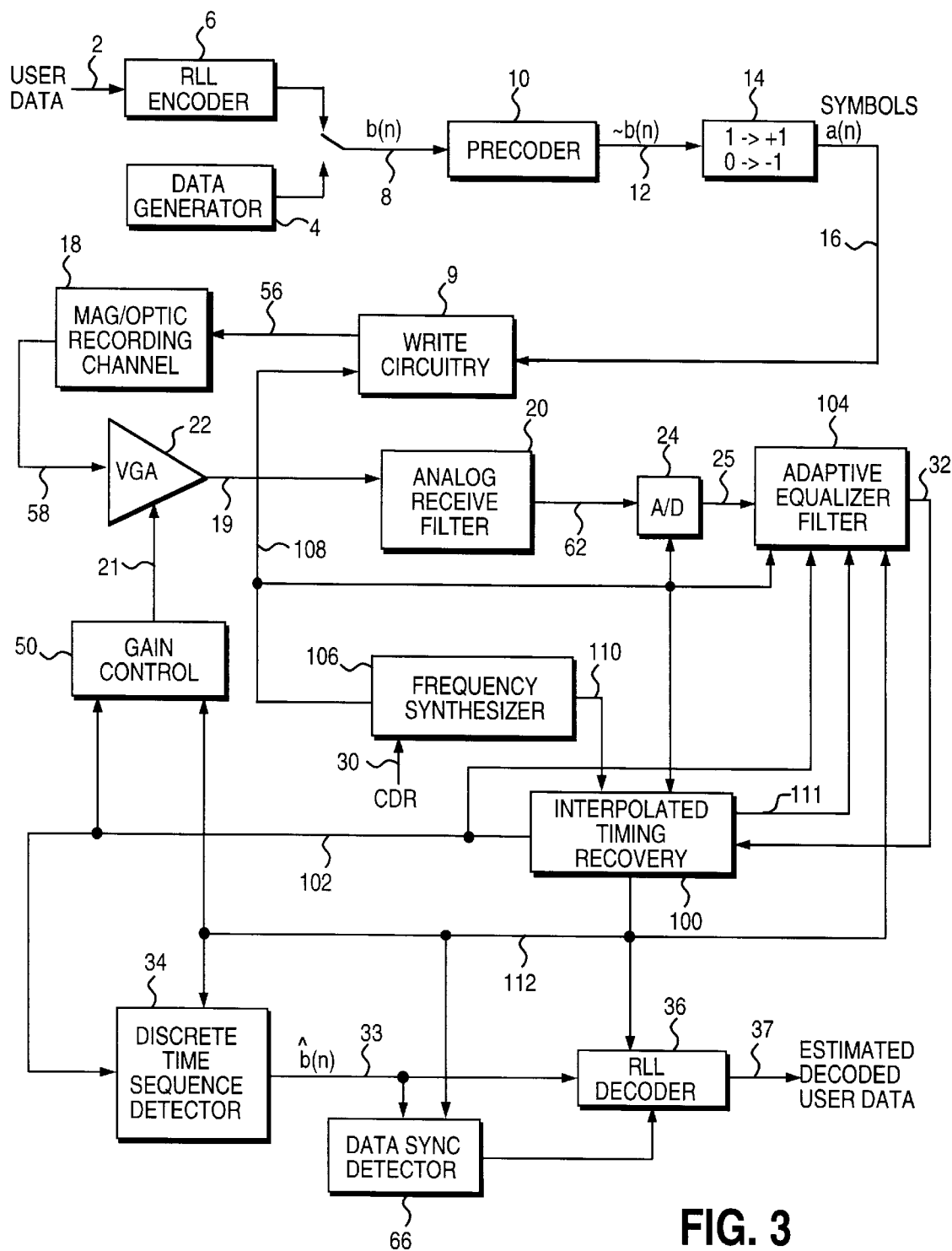
FIG. 3 is a block diagram of the sub-sampled read channel of the present invention comprising interpolated timing recovery (ITR) and an adaptive discrete-time equalizer.

FIG. 3 shows the sub-sampled read channel of the present invention, comprising interpolated timing recovery (ITR) 100 and an adaptive discrete-time equalizer 104. The sampling device 24 samples the analog read signal 62 at a rate significantly below the baud rate (for example, 10% below Nyquist) rather than synchronously sampling at the baud rate as in the prior art read channel shown in FIG. 1. The conventional synchronous-sampling timing recovery 28 of FIG. 1 is replaced with the ITR 100 of the present invention which interpolates the asynchronous sample values 32 and generates interpolated sample values 102 substantially synchronized to the baud rate. A frequency synthesizer 106 generates a baud rate write clock 108 applied to the write circuitry 9 during a write operation, and an asynchronous sampling clock 108 for clocking the sampling device 24, the discrete-time adaptive equalizer 104, and the ITR 100 at a frequency substantially below the baud rate (as determined by the data rate of the current zone (CDR 30)) during a read operation. The frequency synthesizer 106 also generates a Nyquist clock 110 at a frequency slightly above the baud rate for use in generating the interpolated sample values 102 as described in more detail below with reference to FIG. 4B. In an alternative embodiment, a first frequency synthesizer generates the write clock, and a second frequency synthesizer generates the two read clocks.

Figure 7:
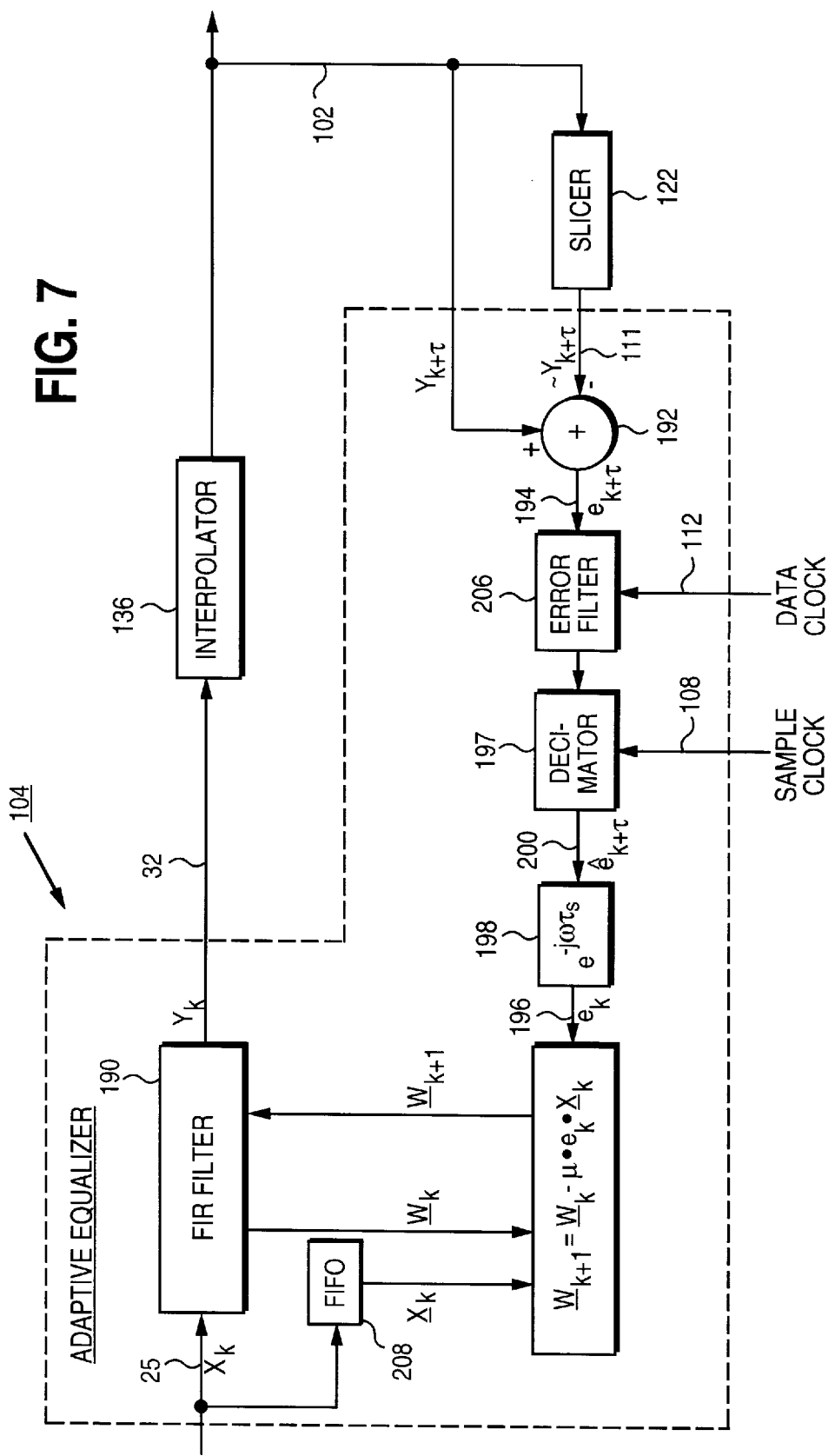
FIG. 7 is a block diagram of the adaptive equalizer employed in the present invention, including an error filter for low-pass filtering the adaptive error signal to compensate for the bandlimited read signal spectrum as shown in FIG. 8C, and to compensate for the non-ideal characteristics of ITR.
Figure 8A:
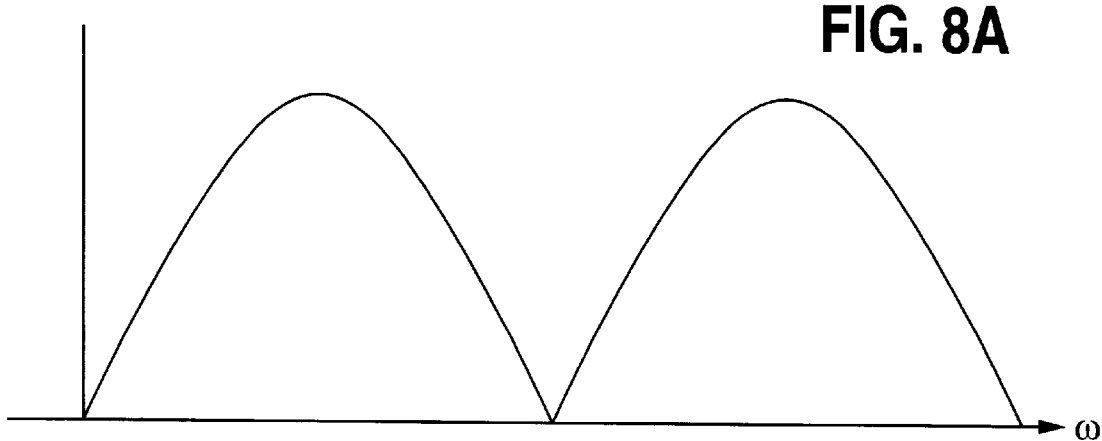
FIGS. 8A–8C illustrate how the undesirable effect of aliasing due to sub-sampling is attenuated by bandlimiting the read signal spectrum.
Figure 8B:
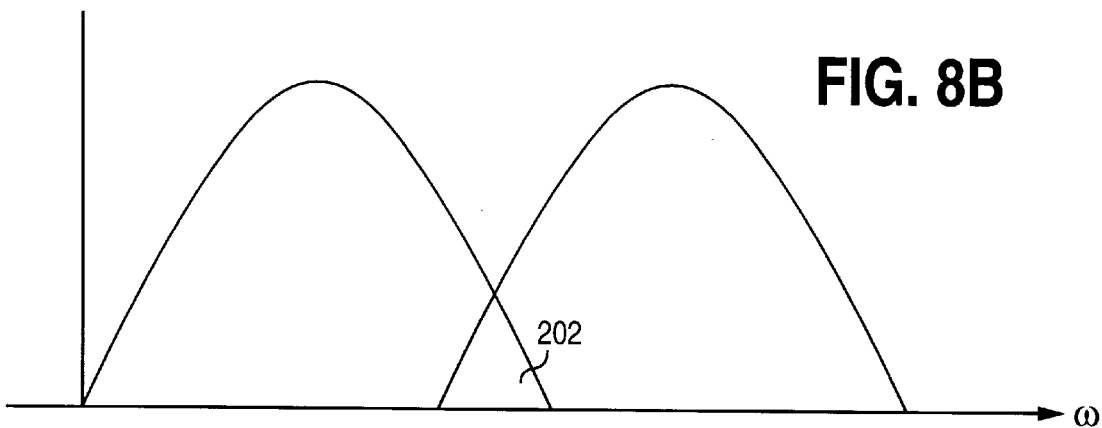
Figure 8C:
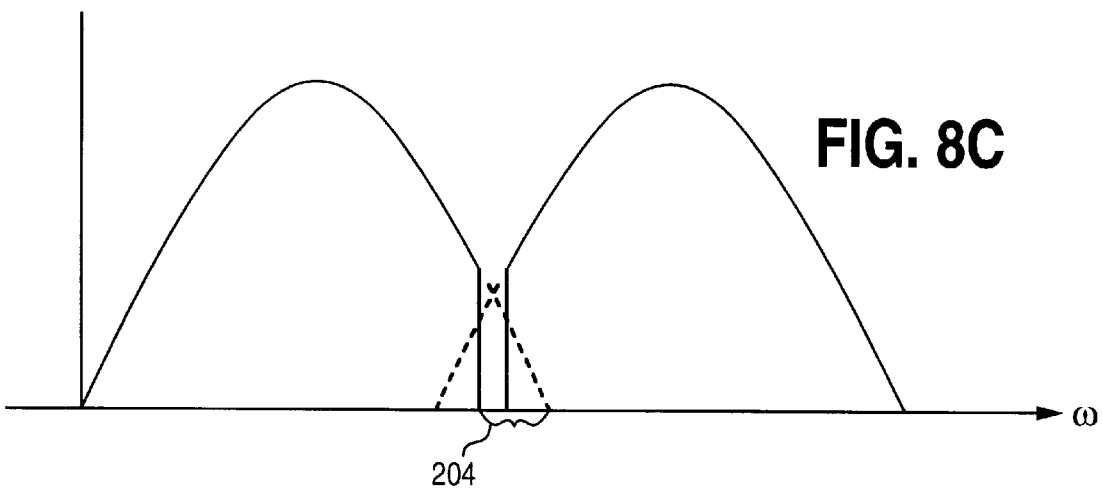

The cutoff frequency of the analog receive filter 20 is reduced, thereby bandlimiting the spectrum of the read signal to attenuate the undesirable effect of aliasing as shown in FIG. 8C. The discrete equalizer 104 is real-time adaptive, receiving interpolated sample values 102 and estimated sample values 111 from the ITR 100 for use in a least mean square (LMS) adaptive algorithm. The discrete-time adaptive equalizer 104 comprises an error filter for filtering the error signal used in the adaptation algorithm to remove the component corresponding to the cutoff part of the read signal spectrum. Further details concerning the adaptive equalizer 104, including the error filter, are provided below with reference to FIG. 7.

A discrete-time sequence detector 34 detects an estimated binary sequence 33 representing the user data from the interpolated sample values 102. The ITR 100 circuit also generates a data clock 112 synchronized to the baud rate on average for clocking operation of the adaptive equalizer 104, gain control 50, discrete-time sequence detector 34, sync mark detector 66 and RLL decoder 36.

Conventional Timing Recovery

Figure 4A:
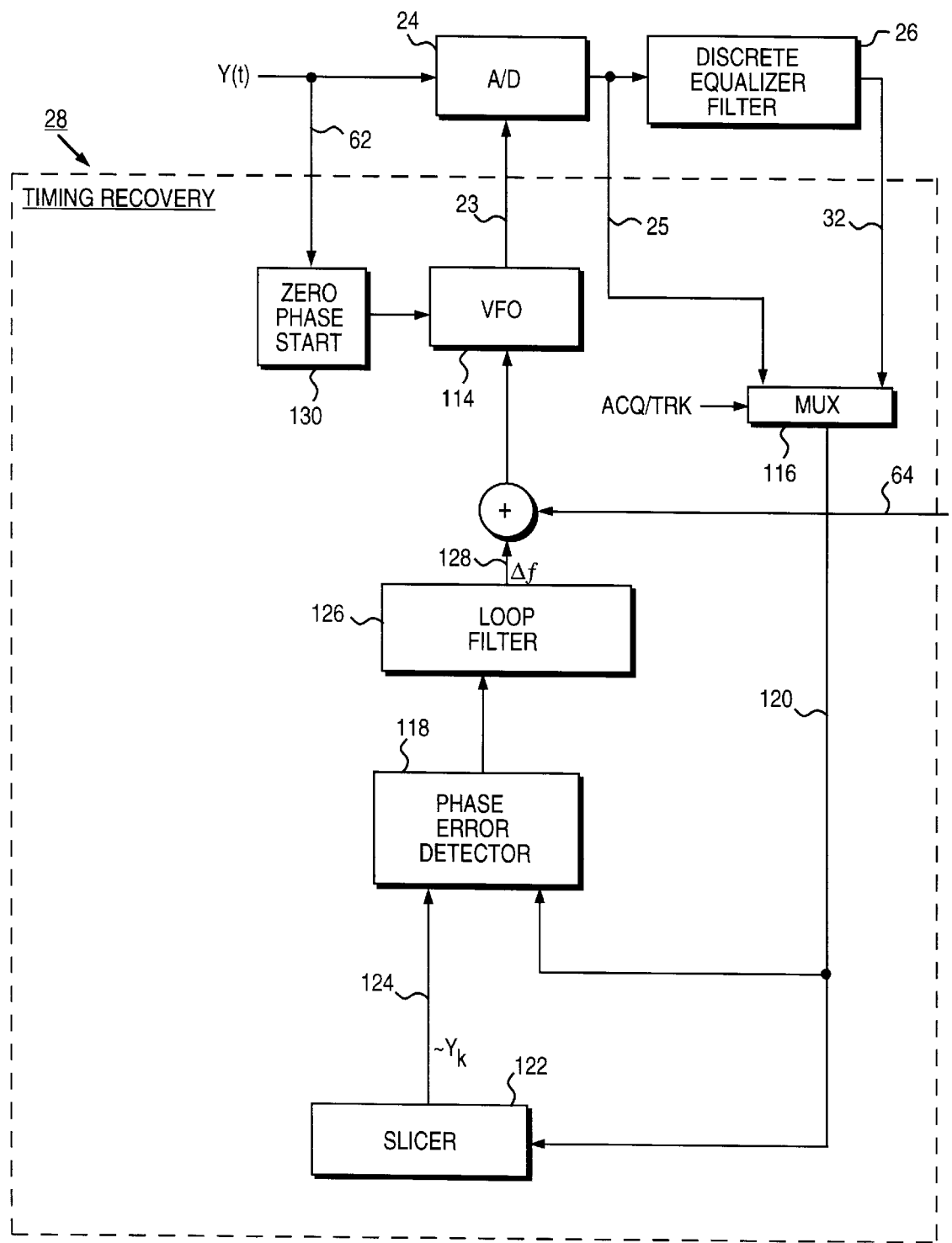
FIG. 4A is a detailed block diagram of the prior art synchronous-sampling timing recovery comprising a sampling VFO for sampling the analog read signal synchronous to the baud rate.

An overview of the conventional synchronous-sampling timing recovery 28 of FIG. 1 is shown in FIG. 4A. The output 23 of a variable frequency oscillator (VFO) 114 controls the sampling clock of a sampling device 24 which is typically an analog-to-digital converter (A/D) in digital read channels. A multiplexer 116 selects the unequalized sample values 25 during acquisition and the equalized sample values 32 during tracking, thereby removing the discrete equalizer 26 from the timing loop during acquisition in order to avoid its associated latency. A phase error detector 118 generates a phase error in response to the sample values received over line 120 and estimated sample values $\sim Y_k$ from a sample value estimator 122, such as a slicer in a d=0 PR4 read channel, over line 124. A loop filter 126 filters the phase error to generate a frequency offset $\Delta f$ 128 that settles to a value proportional to a frequency difference between the sampling clock 23 and the baud rate. The frequency offset $\Delta f$ 128, together with the center frequency control signal 64 from the frequency synthesizer 52, adjust the sampling clock 23 at the output of the VFO 114 in order to synchronize the sampling to the baud rate.

A zero phase start 130 circuit suspends operation of the VFO 114 at the beginning of acquisition in order to minimize the initial phase error between the sampling clock 23 and the read signal 62. This is achieved by disabling the VFO 114, detecting a zero crossing in the analog read signal 62, and re-enabling the VFO 114 after a predetermined delay between the detected zero crossing and the first baud rate sample.

Interpolated Timing Recovery

Figure 4B:
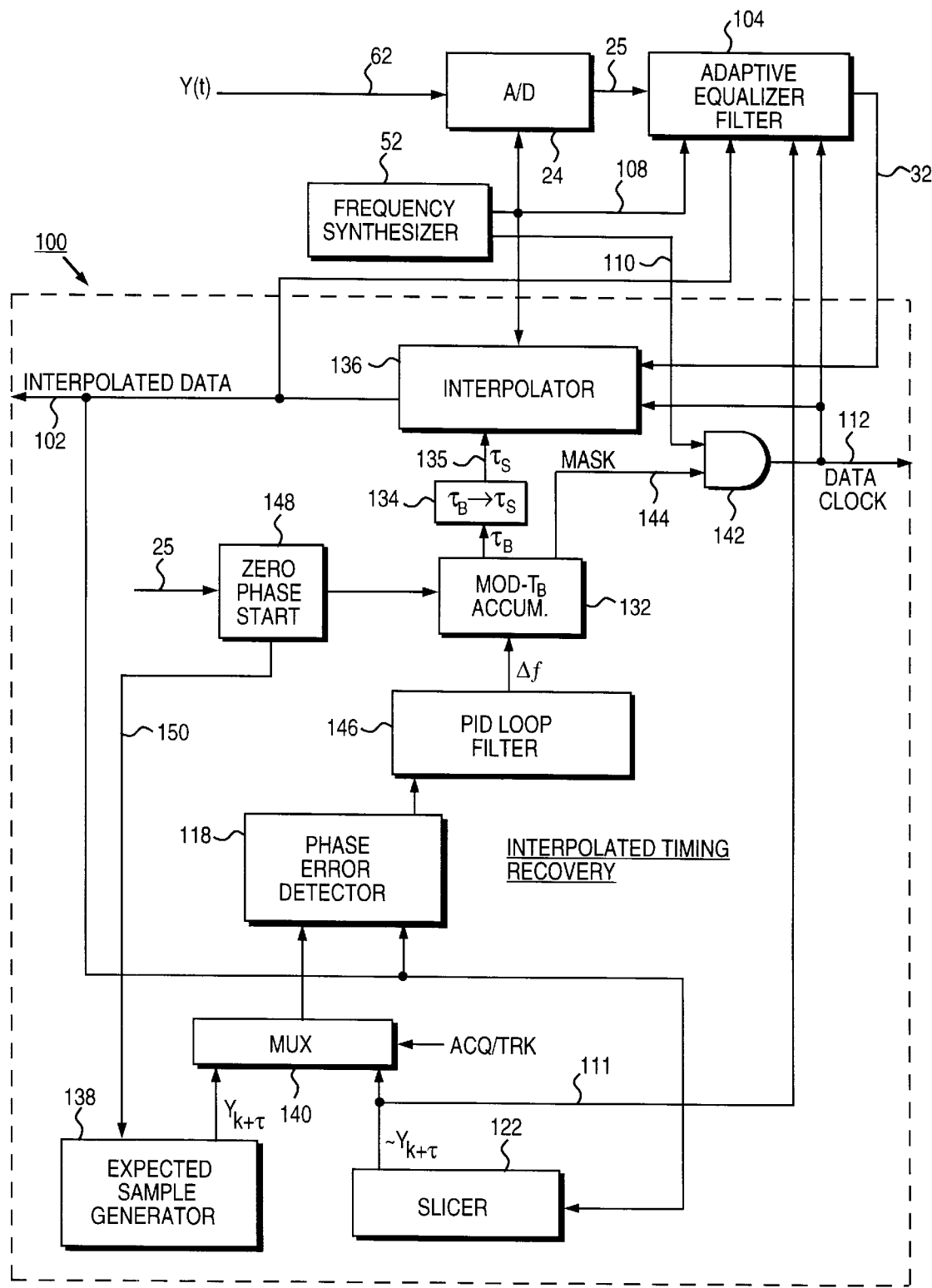
FIG. 4B is a detailed block diagram of the interpolating timing recovery (ITR) of the present invention comprising an interpolator for interpolating the sub-sampled channel samples to generate synchronous sample values.

The interpolated timing recovery (ITR) 100 used in the sub-sampled read channel of the present invention is shown in FIG. 4B. The VFO 114 in the conventional timing recovery of FIG. 4A is replaced with a modulo-$T_B$ accumulator 132, a baud-to-sample rate converter $\tau_B \rightarrow \tau_S$ 134, and an interpolator 136. In addition, an expected sample value generator 138 generates expected samples $Y_{k+\tau}$ used by the phase error detector 118 to compute the phase error during acquisition. A multiplexer 140 selects the estimated sample values $\sim Y_{k+\tau}$ from the slicer 122 for use by the phase error detector 118 during tracking.

A data clock 112 is generated at the output of an AND gate 142 in response to the baud rate read clock 110 generated by frequency synthesizer 52 and a mask signal 144 generated by the modulo-$T_B$ accumulator 132. Further details concerning the baud rate read clock 110 and the mask signal 144 are provided below with reference to FIG. 5. The phase error detector 118 and the slicer 122 process interpolated sample values 102 at the output of the interpolator 136 rather than the channel sample values 32 at the output of the discrete equalizer 26 as in FIG. 4A. A PID loop filter 146 controls the closed loop frequency response similar to the loop filter 126 of FIG. 4A. The interpolated sample values 102 and the estimated sample values $\sim Y_{k+\tau}$ 111 from the slicer 122 are input into the adaptive equalizer 104 of FIG. 3 for use by a least mean square (LMS) algorithm, the details of which are set forth below with reference to FIG. 7.

In the ITR 100 of the present invention, locking a VFO to a reference frequency before acquiring the preamble is no longer necessary; multiplexing 60 the write clock 54 into the analog receive filter 20 (as in FIG. 1) is not necessary. Further, the sampling device 24 and the discrete equalizer 26, together with their associated delays, have been removed from the timing recovery loop; it is not necessary to multiplex 116 around the discrete equalizer 26 between acquisition and tracking. However, it is still necessary to acquire a preamble 68 before tracking the user data 72. To this end, a zero phase start (ZPR) circuit 148 minimizes the initial phase error between the interpolated sample values and the baud rate at the beginning of acquisition similar to the ZPR circuit 130 of FIG. 4A. However, rather than suspend operation of a sampling VFO 114, the ZPR circuit 148 for ITR 100 computes an initial phase error $\tau_B$ from the A/D 24 sample values 25 and loads this initial phase error into the modulo-$T_B$ accumulator 132. The ZPR circuit 148 also generates a control signal over line 150 for initializing the expected sample generator 138 before beginning acquisition.

For more details concerning the ZPR circuit 148, refer to the above referenced U.S. patent application entitled "Zero Phase Restart for Interpolated Timing Recovery in a Sampled Amplitude Read Channel." For more details concerning the PID loop filter 146, phase error detector 118, expected sample generator 138, and slicer 122, refer to the above referenced co-pending U.S. patent applications "Sampled Amplitude Read Channel Comprising Sample Estimation Equalization, Defect Scanning, Channel Quality, Digital Servo Demodulation, PID Filter for Timing Recovery, and DC Offset Control" and "Improved Timing Recovery For Synchronous Partial Response Recording." A detailed description of the modulo-$T_B$ accumulator 132, baud-to-sample rate converter $\tau_B \to \tau_S$ 134, data clock 112, and interpolator 136 is provided in the following discussion.

Interpolator

Figure 5:
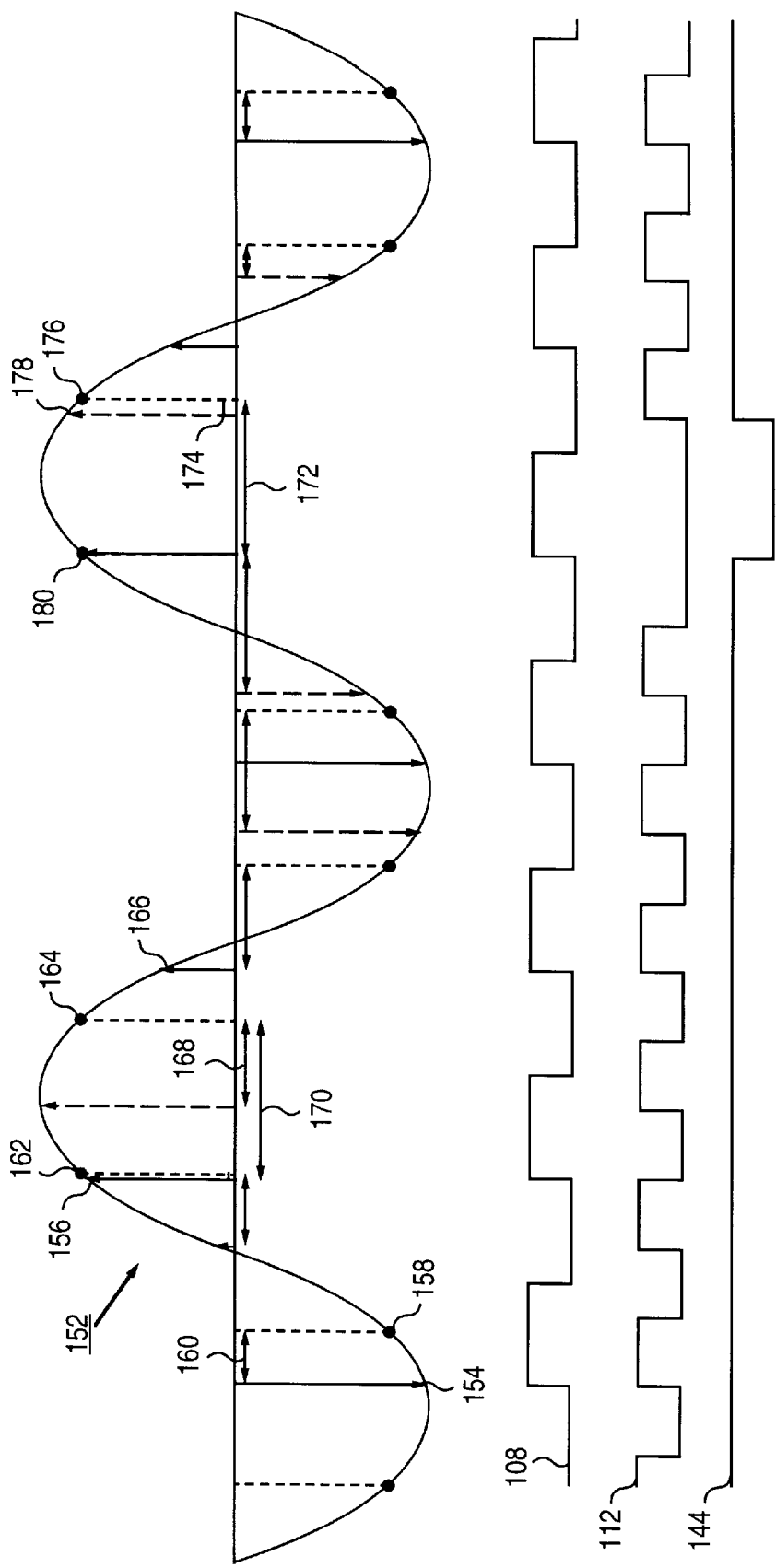
FIG. 5 illustrates the sub-sampled channels samples in relation to the interpolated baud rate samples for the acquisition preamble.

The interpolator 136 of FIG. 4B is understood with reference to FIG. 5 which shows a sampled 2T acquisition preamble signal 152. In this example, the read signal is sampled at a rate slightly above ⅔ the baud rate. Thus, the frequency synthesizer 52 generates an asynchronous sampling clock 108 at a frequency slightly above ⅔ the baud rate, and a Nyquist clock 110 at a frequency slightly above the baud rate. This is accomplished by dividing a base frequency by 2 and 3 to generate the Nyquist clock 110 and asynchronous sampling clock 108, respectively. A data clock 112 synchronized to the baud rate on average is generated by masking appropriate cycles of the Nyquist clock 110 through AND gate 142 using a MASK signal 144 generated by the MOD-$T_B$ accumulator 132.

In FIG. 5, the target synchronous sample values 102 are shown as black circles, the asynchronous channel sample values 32 as vertical arrows with solid lines, and the Nyquist clock intervals 110 shown as vertical arrows with dashed lines. Beneath the sampled preamble signal 152 is a timing diagram depicting the corresponding timing signals for the asynchronous sampling clock 108, the data clock 112, and the mask signal 144.

The function of the interpolator is to estimate the target sample values by interpolating the channel sample values. For illustrative purposes, consider a simple estimation algorithm, linear interpolation:

$$Y(N-1) = x(N-1) + \tau_S \cdot (x(N) - x(N-1)) \qquad (1)$$

where $x(N-1)$ and $x(N)$ are the channel samples surrounding the target sample, and $\tau_S$ is a sampling rate interpolation interval proportional to a time difference between the channel sample value $x(N-1)$ and the target sample value. The sample rate interpolation interval $\tau_S$ is generated by converting a baud rate interpolation interval $\tau_B$ at baud-to-sample rate converter $\tau_B \to \tau_S$ 134 of FIG. 4B. The baud rate interpolation interval $\tau_B$ is generated at the output of the MOD-$T_B$ accumulator 132 which accumulates the frequency offset signal $\Delta f$ at the output of the PID loop filter 146:

$$\tau_B = (\Sigma \Delta f) MOD\ T_B \qquad (2)$$

where $T_B$ is the period of the Nyquist clock 110. Since the Nyquist clock 110 cycles at a frequency slightly higher than the baud rate, to generate the data clock 112 it is necessary to mask 144 the Nyquist clock 110 every time the accumulated frequency offset $\Delta f$, integer divided by $T_B$, increments by 1. Operation of the data clock 112, the mask signal 144 generated by the modulo-$T_B$ accumulator 132, and the baud-to-sample rate converter 134 is understood with reference to the timing diagram of FIG. 5.

Assuming the interpolator 136 implements the simple linear equation (1) above, then channel sample values 154 and 156 are used to generate the interpolated sample value corresponding to target sample value 158. The baud rate interpolation interval $\tau_B$ is generated according to equation (2) above, and the sample rate interpolation interval $\tau_S$ 160 is computed as ⅔ the baud rate interpolation interval $\tau_B$ because the phase offset between the sampling clock 108 and the Nyquist clock 110 is zero (i.e., the baud-to-sample rate converter 134 simply multiplies the baud rate interval $\tau_B$ by ⅔ to generate the sample rate interval $\tau_S$ 160). The next two interpolated sample values corresponding to the next two target values 162 and 164 are computed from channel sample values 156 and 166. To generate the second interpolated sample 164, the baud rate interpolation interval $\tau_B$ 168 is computed according to equation (2) above. The baud rate interpolation interval $\tau_B$ 168 is then converted to a sample rate interpolation interval $\tau_S$ 170 by multiplying the baud rate interpolation interval $\tau_B$ 168 by ⅔ and adding the phase offset between the sampling clock 108 and the Nyquist clock 110.

This process continues until the baud rate interpolation interval $\tau_B$ 172 would be greater than $\tau_B$ except that it "wraps" around and is actually $\tau_B$ 174 (i.e., the accumulated frequency offset $\Delta f$, integer divided by $\tau_B$, increments by 1 causing the mask signal 144 to activate). At this point, the Nyquist clock 110 is masked by MASK signal 144 so that the interpolated sample value corresponding to the target sample value 176 is computed at Nyquist clock 110 interval 178 rather than at Nyquist clock 110 interval 180. In this manner the interpolated sample values are generated at the baud rate on average (i.e., the data clock 112 cycles at the baud rate on average).

The simple linear interpolation of equation (1) above will only work if the analog read signal is sampled at a much higher frequency than the baud rate. This is not desirable since operating the channel at higher frequencies increases its complexity and cost. Therefore, in the preferred embodiment the interpolator 136 is implemented as an FIR filter responsive to more than two channel samples to compute the interpolated sample value.

The ideal discrete-time phase interpolation FIR filter has a flat magnitude response and a constant group delay of $\tau$:

$$C_\tau(e^{j\omega}) = e^{j\omega\tau} \qquad (3)$$

which has an ideal impulse response:

$$\sin c(\pi \cdot (n - \tau/T)). \qquad (4)$$

Unfortunately, the above non-causal infinite impulse response (4) cannot be realized. Therefore, the impulse response of the interpolation filter is designed to be a best fit approximation of the ideal impulse response (4). This can be accomplished by minimizing a mean squared error between the frequency response of the actual interpolation filter and the frequency response of the ideal interpolation filter (3). This approximation can be improved by taking into account the spectrum of the input signal, that is, by minimizing the mean squared error between the input spectrum multiplied by the actual interpolation spectrum and the input spectrum multiplied by the ideal interpolation spectrum:

$$\overline{C}_\tau(e^{j\omega})X(e^{j\omega})-C_\tau(e^{j\omega})X(e^{j\omega}) \quad (5)$$

where $\overline{C}_\tau(e^{j\omega})$ is the spectrum of the actual interpolation filter; and $X(e^{j\omega})$ is the spectrum of the input signal. From equation (5), the mean squared error is represented by:

$$E_\tau^2 = \frac{1}{2\pi} \int_{-\pi}^{\pi} |\overline{C}_\tau(e^{j\omega}) - e^{j\omega\tau}|^2 |X(e^{j\omega})|^2 d\omega \quad (6)$$

where $X(e^{j\omega})$ is the spectrum of the read channel (e.g., PR4, EPR4, EEPR4 of Table 1 or some other partial response spectrum).

In practice, the above mean squared error equation (6) is modified by specifying that the spectrum of the input signal is bandlimited to some predetermined constant $0 \leq \omega \leq \alpha\pi$ where $0 < \alpha < 1$; that is:

$$|X(e^{j\omega})|=0, \text{ for } |\omega| \geq \alpha\pi.$$

Then equation (6) can be expressed as:

$$E_{\tau,\alpha}^2 = \frac{1}{2\pi} \int_{-\alpha\pi}^{\alpha\pi} |\overline{C}_\tau(e^{j\omega}) - e^{j\omega\tau}|^2 |X(e^{j\omega})|^2 d\omega. \quad (7)$$

The solution to the minimization problem of equation (7) involves expressing the actual interpolation filter in terms of its coefficients and then solving for the coefficients that minimize the error in a classical mean-squared sense.

The actual interpolation filter can be expressed as the FIR polynomial:

$$\overline{C}_\tau(e^{j\omega}) = \sum_{n=-R}^{n=R-1} C_\tau(n) e^{-j\omega n} \quad (8)$$

where 2R is the number of taps in each interpolation filter and the sample period Ts has been normalized to 1. A mathematical derivation for an interpolation filter having an even number of coefficients is provided below. It is within the ability of those skilled in the art to modify the mathematics to derive an interpolation filter having an odd number of coefficients.

Substituting equation (8) into equation (7) leads to the desired expression in terms of the coefficients $C_\tau(n)$:

$$E_{\tau,\alpha}^2 = \frac{1}{2\pi} \int_{-\alpha\pi}^{\alpha\pi} \left| \sum_{n=-R}^{n=R-1} C_\tau(n) e^{-j\omega n} - e^{j\omega\tau} \right|^2 |X(e^{j\omega})|^2 d\omega. \quad (9)$$

The next step is to take the derivatives of equation (9) with respect to the coefficients $C_\tau(n)$ and set them to zero:

$$\frac{\partial E_{\tau,\alpha}^2}{\partial c_\tau(n_o)} = 0 \text{ for } n_o = -R, \ldots, 0, 1, \ldots, R-1. \quad (10)$$

After careful manipulation, equation (10) leads to:

$$\int_{-\alpha\pi}^{\alpha\pi} \left[ \left( \sum_{n=-R}^{n=R-1} c_\tau(n)\cos(\omega(n_o-n)) \right) - \cos(\omega(n_o+\tau)) \right] |X(e^{j\omega})|^2 d\omega = 0 \quad (11)$$

for $n_0 = -R, \ldots, 0, 1, \ldots, R-1$.

$$\phi(r) = \int_{-\alpha\pi}^{\alpha\pi} |X(e^{j\omega})|^2 \cos(\omega r) d\omega \quad (12)$$

Defining $\phi(r)$ as:

$$C_\tau = \phi_T^{-1} \phi_\tau \quad (15)$$

where $\phi_T^{-1}$ is an inverse matrix that can be solved using well known methods.

TABLE 2

| $\tau_s \cdot 32/T_s$ | C (−2) | C (−1) | C (0) | C (1) | C (2) | C (3) |
|---|---|---|---|---|---|---|
| 0 | 0.0000 | −0.0000 | 1.0000 | 0.0000 | −0.0000 | 0.0000 |
| 1 | 0.0090 | −0.0231 | 0.9965 | 0.0337 | −0.0120 | 0.0068 |
| 2 | 0.0176 | −0.0445 | 0.9901 | 0.0690 | −0.0241 | 0.0135 |
| 3 | 0.0258 | −0.0641 | 0.9808 | 0.1058 | −0.0364 | 0.0202 |
| 4 | 0.0335 | −0.0819 | 0.9686 | 0.1438 | −0.0487 | 0.0268 |
| 5 | 0.0407 | −0.0979 | 0.9536 | 0.1829 | −0.0608 | 0.0331 |
| 6 | 0.0473 | −0.1120 | 0.9359 | 0.2230 | −0.0728 | 0.0393 |
| 7 | 0.0533 | −0.1243 | 0.9155 | 0.2638 | −0.0844 | 0.0451 |
| 8 | 0.0587 | −0.1348 | 0.8926 | 0.3052 | −0.0957 | 0.0506 |
| 9 | 0.0634 | −0.1434 | 0.8674 | 0.3471 | −0.1063 | 0.0556 |
| 10 | 0.0674 | −0.1503 | 0.8398 | 0.3891 | −0.1164 | 0.0603 |
| 11 | 0.0707 | −0.1555 | 0.8101 | 0.4311 | −0.1257 | 0.0644 |
| 12 | 0.0732 | −0.1589 | 0.7784 | 0.4730 | −0.1341 | 0.0680 |
| 13 | 0.0751 | −0.1608 | 0.7448 | 0.5145 | −0.1415 | 0.0710 |
| 14 | 0.0761 | −0.1611 | 0.7096 | 0.5554 | −0.1480 | 0.0734 |
| 15 | 0.0765 | −0.1598 | 0.6728 | 0.5956 | −0.1532 | 0.0751 |
| 16 | 0.0761 | −0.1572 | 0.6348 | 0.6348 | −0.1572 | 0.0761 |
| 17 | 0.0751 | −0.1532 | 0.5956 | 0.6728 | −0.1598 | 0.0765 |
| 18 | 0.0734 | −0.1480 | 0.5554 | 0.7096 | −0.1611 | 0.0761 |
| 19 | 0.0710 | −0.1415 | 0.5145 | 0.7448 | −0.1608 | 0.0751 |
| 20 | 0.0680 | −0.1341 | 0.4730 | 0.7784 | −0.1589 | 0.0732 |
| 21 | 0.0644 | −0.1257 | 0.4311 | 0.8101 | −0.1555 | 0.0707 |
| 22 | 0.0603 | −0.1164 | 0.3891 | 0.8398 | −0.1503 | 0.0674 |
| 23 | 0.0556 | −0.1063 | 0.3471 | 0.8674 | −0.1434 | 0.0634 |
| 24 | 0.0506 | −0.0957 | 0.3052 | 0.8926 | −0.1348 | 0.0587 |
| 25 | 0.0451 | −0.0844 | 0.2638 | 0.9155 | −0.1243 | 0.0533 |
| 26 | 0.0393 | −0.0728 | 0.2230 | 0.9359 | −0.1120 | 0.0473 |
| 27 | 0.0331 | −0.0608 | 0.1829 | 0.9536 | −0.0979 | 0.0407 |
| 28 | 0.0268 | −0.0487 | 0.1438 | 0.9686 | −0.0819 | 0.0335 |
| 29 | 0.0202 | −0.0364 | 0.1058 | 0.9808 | −0.0641 | 0.0258 |
| 30 | 0.0135 | −0.0241 | 0.0690 | 0.9901 | −0.0445 | 0.0176 |
| 31 | 0.0068 | −0.0120 | 0.0337 | 0.9965 | −0.0231 | 0.0090 |

Figure 6:
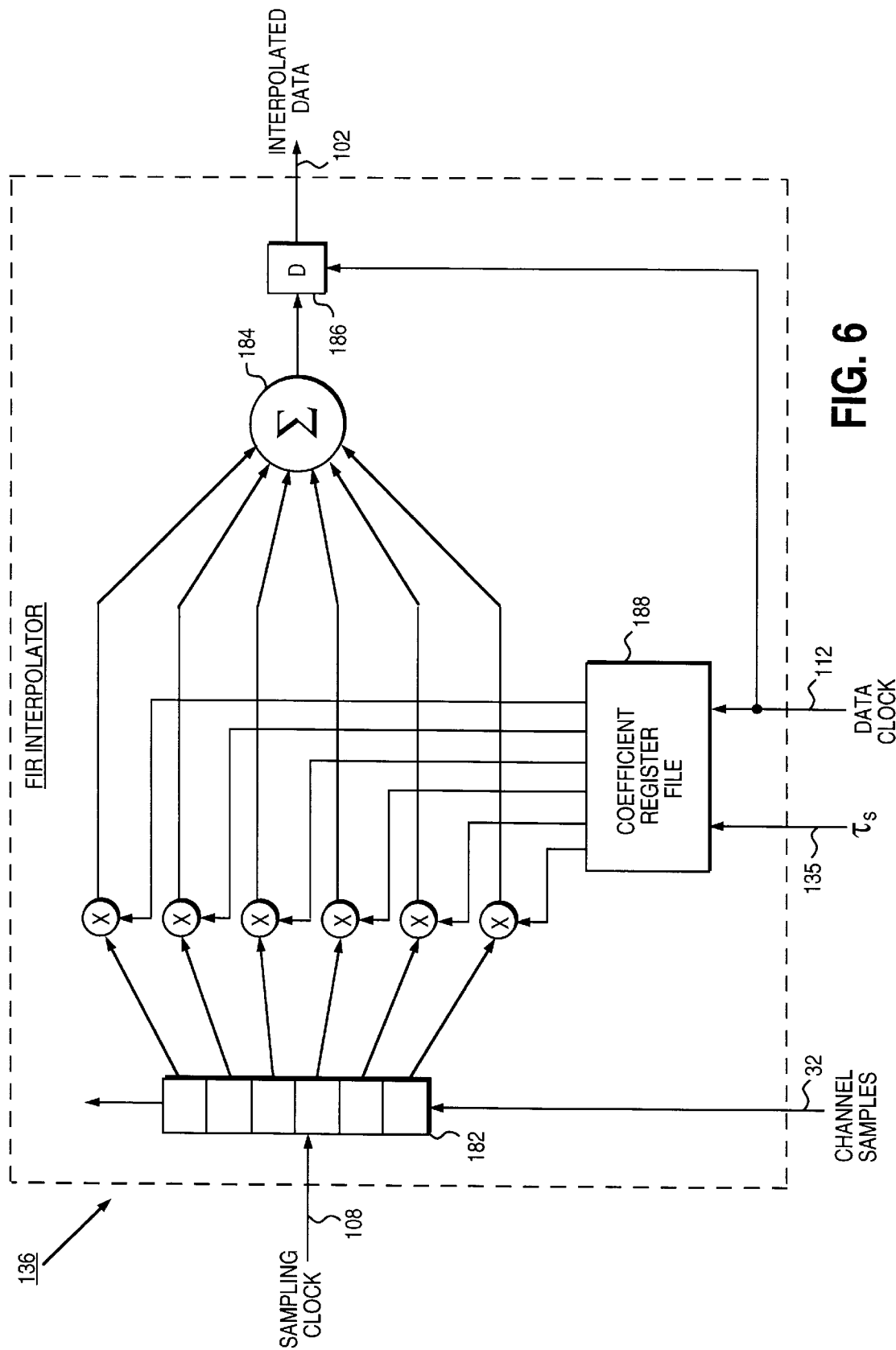
FIG. 6 shows an FIR filter implementation for the ITR interpolator.

Table 2 above shows example coefficients $C_\tau(n)$ calculated from equation (15) with 2R=6, $\alpha$=0.8 and $X(e^{j\omega})$=PR4 where $T_S$ is the period of the sampling clock 108. The implementation of the six tap FIR filter is shown in FIG. 6. A shift register 182 receives the channel samples 32 at the sampling clock rate 108. The filter coefficients $C_\tau(n)$ are stored in a coefficient register file 188 and applied to corresponding multipliers according to the current value of $\tau_S$ 135 (i.e., the interpolator 136 is a time varying FIR filter). The coefficients are multiplied by the channel samples 32 stored in the shift register 182. The resulting products are summed 184 and the sum stored in a delay register 186. The coefficient register file 188 and the delay register 186 are clocked by the data clock 112 to implement the masking function described above. The output of the FIR filter is the interpolated data 102 substantially synchronized to the baud rate.

Adaptive Equalizer With Sub-sampling

FIG. 7 is a block diagram of the adaptive, discrete-time equalizer 104 of the present invention. Sample values from the A/D 24 are input over line 25 to a discrete-time FIR filter 190 comprising a predetermined number of coefficients, the values of which determine the filter's gain and phase response. Because the FIR filter 190 operates on the sample values prior to ITR 100, its order can be increased over the prior art without adversely affecting the latency of timing recovery (i.e., the number of filter coefficients can be increased).

The output $Y_k$ 32 of the FIR filter 190 is input into the interpolator 136 for generating the interpolated sample values $Y_{k+\tau}$ 102. The interpolated sample values $Y_{k+\tau}$ 102 are input into a slicer 122 (FIG. 4B) which generates estimated sample values $\sim Y_{k+\tau}$ 111. The estimated sample values $\sim Y_{k+\tau}$ 111 are subtracted from the interpolated sample values $Y_{k+\tau}$ 102 at adder 192 to generate a sample error value $e_{k+\tau}$ 194 that is synchronized to the baud rate rather than the sample rate. Because the LMS algorithm operates on sample values $X_k$ at the sample rate, it is necessary to convert the error values $e_{k+\tau}$ 194 into error values $e_k$ 196 synchronous to the sample rate. This is accomplished by a decimator 197 and an inverse-interpolation circuit 198.

The decimator 197 converts or down-samples the baud rate error samples $e_{k+\tau}$ 194 to the sample rate $\hat{e}_{k+\tau}$ 200, and the inverse-interpolation circuit 198 interpolates the sample-rate error values $\hat{e}_{k+\tau}$ 200 to generate synchronized error values $e_k$ 196. That is, the inverse-interpolation circuit 198 uses the inverse of the ITR interval $-\tau_S$ to generate the error sequence $e_k$ 196 synchronized to the sampling rate. The inverse-interpolation circuit 198 approximates the ideal inverse-interpolation operation $e^{-jw\tau S}$, preferably using a first order linear interpolation algorithm. However the inverse-interpolation circuit 198 may be a simple zero order hold, or a more complex interpolation filter as described above. The preferred first order linear interpolation algorithm is:

$$e_k = \hat{e}_{(k-1)+\tau} + (\hat{e}_{k+\tau} - \hat{e}_{(k-1)+\tau}) \cdot (1-\tau_S).$$

The synchronized error sequence $e_k$ 196 is then used to update the coefficients of the FIR filter 190 according to a least mean square (LMS) adaptive algorithm, $$\underline{W}_{k+1} = \underline{W}_k - \mu \cdot e_k \cdot \underline{X}_k,$$

where $\underline{W}_k$ is the vector of FIR filter coefficients, $\mu$ is a programmable gain, $e_k$ is the sample error between the FIR filter's actual output and a desired output, and $\underline{X}_k$ is a vector of samples values (or a scalar $X_k$) from the FIR filter input. The result of the above LMS adaptive algorithm is to adjust the coefficients of the FIR filter 190 to minimize the error between the read channel's actual response and the desired partial response. Preferably, the LMS algorithm described above also constrains the magnitude and phase response of the adaptive filter to attenuate interference from the timing recovery and gain control loops. An example embodiment of a constrained adaptive equalizer is disclosed in the above referenced U.S. patent application entitled "Gain and Phase Constrained Adaptive Equalizing Filter in a Sampled Amplitude Read Channel for Magnetic Recording." In that application, the LMS algorithm is modified to include an orthogonal projection operation which constrains the gain and phase response of the adaptive equalizer.

In the conventional synchronous-sampling read channel of FIG. 1 where the read signal is sampled at the baud rate, noise due to aliasing is negligible because the sampling rate is substantially the Nyquist rate as shown in FIG. 8A. In the sub-sampled read channel of the present invention, however, there is a significant amount of aliasing noise due to sub-sampling the read signal substantially below the Nyquist rate. FIG. 8B shows the effect of aliasing due to sub-sampling: the periodic signal spectrums overlap 202, thereby distorting the higher frequency components of the read signal. This undesirable effect can be attenuated by bandlimiting the signal spectrum (decreasing the cutoff frequency of the analog receive filter 20) so that no overlap occurs as shown in FIG. 8C.

Bandlimiting the signal spectrum, however, has an adverse effect on the adaptive, discrete equalizer 104. The conventional LMS adaptive algorithm attempts to match the read channel's response to the entire signal spectrum. Because a significant part 204 of the signal spectrum is cutoff to avoid aliasing, the component of the error signal $e_k$ corresponding to the cutoff part of the signal spectrum 204 diverges causing the coefficients of the adaptive equalizer to diverge. Another undesirable effect due to the non-ideal characteristics of ITR 100 is aliasing in the error signal. The up-sampling operation of ITR 100 compresses the signal spectrum producing a null around Nyquist, and the down-sampling operation of the decimator 197 of FIG. 7 expands the signal spectrum back into its original shape. The non-ideal characteristic of the timing recovery interpolation filter 136 described above introduces signal power around Nyquist which causes aliasing in the error signal when down-sampled by the decimator 197.

To attenuate the undesirable effects of sub-sampling with respect to the LMS adaptive algorithm, the present invention provides a low-pass error filter 206 (FIG. 7) to bandlimit the spectrum of the baud rate error signal $e_{k+\tau}$ 194 before down-sampling by the decimator 197. Thus, the spectrum of the error signal is constrained to the bandlimited signal spectrum of FIG. 8C. In addition, the spectrum of the error filter 206 is preferably matched the spectrum of the band-limited signal spectrum in order to compensate for the distortions in the read signal caused by the non-ideal characteristics of ITR 100. This can be accomplished with a simple 3-tap or 5-tap symmetric low-pass FIR filter (e.g., for 90% sub-sampling the preferred ceofficients for a three tap FIR filter are 1.034, 2, and 1.034). The coefficients of the error filter 206 may be fixed, or they may be adaptable to operate according to the degree of sub-sampling and/or to the particular characteristics of the recording device (e.g., across each zone). The error filter 206 is clocked by the data clock 112 and the decimator 197 is clocked by the sample clock 108. The adaptive equalizer 104 comprises a FIFO buffer 208 which buffers the channel samples $\underline{X}_k$ to account for the delay in ITR 100 and in the circuitry for computing the sample error sequence $e_k$ 196.

The objects of the invention have been fully realized through the embodiments disclosed herein. Those skilled in the art will appreciate that the various aspects of the invention can be achieved through different embodiments without departing from the essential function. The particular embodiments disclosed are illustrative and not meant to limit the scope of the invention as appropriately construed by the following claims.

We claim:

1. A sampled amplitude read channel for reading data recorded on a disk storage medium at a predetermine baud rate by detecting the recorded data from discrete-time sample values generated by sampling an analog read signal from a read head positioned over the disk storage medium, comprising:

(a) an analog filter for substantially bandlimiting a signal spectrum of the analog read signal to less than 90% of a bandwidth of a target partial response;

(b) a sampling device for asynchronously sampling the analog read signal at less than 90% of the baud rate to generate the discrete-time sample values;

(c) an adaptive equalizer, responsive to the discrete-time sample values, for generating equalized sample values according to the target partial response; and (d) a discrete-time sequence detector for detecting the recorded data from the equalized sample values.

2. The sampled amplitude read channel as recited in claim 1, further comprising interpolated timing recovery for interpolating the asynchronous sample values to generate synchronous sample values substantially synchronized to the baud rate.

3. The sampled amplitude read channel as recited in claim 1, wherein the adaptive equalizer comprises a plurality of coefficients adjusted in response to an error value generated relative to a difference between an actual and ideal frequency response, further comprising a low-pass error filter for bandlimiting the error value.

4. The sampled amplitude read channel as recited in claim 3, wherein a spectrum of the error filter substantially matches the bandlimited spectrum of the target partial response.

5. The sampled amplitude read channel as recited in claim 1, further comprising:

(a) interpolated timing recovery for interpolating the asynchronous sample values to generate interpolated sample values substantially synchronized to the baud rate;

(b) a sample value estimator for generating estimated ideal sample values from the interpolated sample values;

(c) an error value generator for generating a baud rate error value relative to a difference between the interpolated sample values and the estimated ideal sample values;

(d) an error filter for bandlimiting the baud rate error value;

(e) an inverse interpolator for converting the bandlimited baud rate error value to a sampling rate error value; and (f) a coefficient updating circuit for updating coefficients of the adaptive equalizer in response to the sampling rate error value.

6. A method for reading data recorded on a disk storage medium at a predetermined baud rate by detecting the recorded data from discrete-time sample values generated by sampling an analog read signal from a read head positioned over the disk storage medium, comprising the steps of:

(a) substantially bandlimiting a signal spectrum of the analog read signal to less than 90% of a bandwidth of a target partial response;

(b) asynchronously sampling the analog read signal at less than 90% of the baud rate to generate the discrete-time sample values;

(c) adaptively equalizing the asynchronous sample values according to the target partial response to generate equalized sample values; and (d) detecting the recorded data from the equalized sample values.

7. The method for reading data as recited in claim 6, further comprising the step of interpolating the asynchronous sample values to generate synchronous sample values substantially synchronized to the baud rate.

8. The method for reading data as recited in claim 6, further comprising the steps of:

(a) generating an error value relative to a difference between an actual and ideal frequency response;

(b) low-pass filtering the error value; and (c) adjusting an equalizing spectrum in response to the filtered error value.

9. The method for reading data as recited in claim 8, wherein the error value is filtered according to a spectrum substantially matched to the bandlimited spectrum of the target partial response.

10. The method for reading data as recited in claim 6, further comprising the steps of:

(a) interpolating the asynchronous sample values to generate interpolated sample values substantially synchronized to the baud rate;

(b) generating estimated ideal sample values from the interpolated sample values;

(c) generating a baud rate error value relative to a difference between the interpolated sample values and the estimated ideal sample values;

(d) low-pass filtering the baud rate error value;

(e) converting the filtered baud rate error value to a sampling rate error value; and (f) updating coefficients of the adaptive equalizer in response to the sampling rate error value.

11. A sampled amplitude read channel for reading data recorded on a disk storage medium at a predetermined baud rate by detecting the recorded data from discrete-time sample values generated by sampling an analog read signal from a read head positioned over the disk storage medium, comprising:

(a) a sampling device for asynchronously sampling the analog read signal at less than 90% of the baud rate to generate the discrete-time sample values;

(b) an adaptive equalizer, responsive to the discrete-time sample values, for generating equalized sample values according to a target partial response;

(c) interpolated timing recovery for up-sampling the equalized sample values to generate synchronous sample values substantially synchronized to the baud rate; and (d) a discrete-time sequence detector for detecting the recorded data from the synchronous sample values.

12. The sampled amplitude read channel as recited in claim 11, further comprising an analog filter for substantially bandlimiting a signal spectrum of the analog read signal to less than 90% of a bandwidth of the target partial response.

13. The sampled amplitude read channel as recited in claim 11, wherein the adaptive equalizer comprises a plurality of coefficients adjusted in response to an error value generated relative to a difference between an actual and ideal frequency response, further comprising an error filter for low-pass filtering the error value.

14. The sampled amplitude read channel as recited in claim 13, wherein a spectrum of the error filter substantially matches the bandlimited spectrum of the target partial response.

15. The sampled amplitude read channel as recited in claim 11, further comprising:

(a) a sample value estimator for generating estimated ideal sample values from the synchronous sample values;

(b) an error value generator for generating a baud rate error value relative to a difference between the synchronous sample values and the estimated ideal sample values;

(c) an error filter for low-pass filtering the baud rate error value;

(d) an inverse interpolator for converting the filtered baud rate error value to a sampling rate error value; and (e) a coefficient updating circuit for updating coefficients of the adaptive equalizer in response to the sampling rate error value.

16. A sampled amplitude read channel for reading data recorded on a disk storage medium at a predetermine baud rate by detecting the recorded data from discrete-time sample values generated by sampling an analog read signal from a read head positioned over the disk storage medium, comprising:

(a) a sampling device for sampling the analog read signal to generate the discrete-time sample values;

(b) a timing recovery circuit for extracting timing information from the discrete-time sample values;

(c) an adaptive equalizer, responsive to the discrete-time sample values, for generating equalized sample values according to a target partial response;

(d) a sample value estimator, responsive to the equalized sample values, for generating estimated ideal sample values corresponding to the target partial response;

(e) a sample error generator, responsive to the discrete-time sample values and the estimated ideal sample values, for generating a sample error value;

(f) a sample error adjuster for adjusting the sample error value according to a predetermined criteria to thereby generate an adjusted error value;

(g) a coefficient updating circuit for updating coefficients of the adaptive equalizer in response to the adjusted error value; and (h) a discrete-time sequence detector for detecting the recorded data from the equalized sample values.

17. The sampled amplitude read channel as recited in claim 16, wherein the sample error adjuster is a discrete-time filter for filtering the sample error value.

18. The sampled amplitude read channel as recited in claim 17, wherein a spectrum of the discrete-time filter substantially matches a spectrum of the target partial response.

19. The sampled amplitude read channel as recited in claim 16, wherein:

(a) the sampling device samples the analog read signal asynchronous to the baud rate of the recorded data to generate asynchronous sample values; and (b) the timing recovery circuit comprises an interpolator for interpolating the asynchronous sample values to generate synchronous sample values.

20. The sampled amplitude read channel as recited in claim 19, wherein:

(a) the sample value estimator generates the estimated ideal sample values from the synchronous sample values;

(b) the sample error generator generates a baud rate error value relative to a difference between the synchronous sample values and the estimated ideal sample values;

(c) the sample error adjuster is an error filter for bandlimiting the baud rate error value;

(d) the coefficient updating circuit comprises an inverse interpolator for converting the bandlimited baud rate error value to a sampling rate error value; and (e) the coefficient updating circuit updates the coefficients of the adaptive equalizer in response to the sampling rate error value.

* * * * *